United States Patent
Baldwin et al.

(10) Patent No.: US 7,175,867 B2
(45) Date of Patent: Feb. 13, 2007

(54) METASTABLE MINERAL-AMINO ACID PREPARATIONS FOR FOOD AND BEVERAGE FORTIFICATION

(75) Inventors: Cheryl Baldwin, Mundelein, IL (US); Ahmad Akashe, Mundelein, IL (US); Manuel Marquez-Sanchez, Lincolnshire, IL (US); Bary Lyn Zeller, Glenview, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 507 days.

(21) Appl. No.: 10/665,829

(22) Filed: Sep. 18, 2003

(65) Prior Publication Data

US 2005/0064071 A1    Mar. 24, 2005

(51) Int. Cl.
    *A23L 1/304* (2006.01)
(52) U.S. Cl. .................. 426/74; 426/590; 426/656
(58) Field of Classification Search ............... 426/74, 426/656, 590
    See application file for complete search history.

(56) References Cited

U.S. PATENT DOCUMENTS

| | | | |
|---|---|---|---|
| 4,737,375 A | 4/1988 | Nakel et al. | |
| 4,830,716 A | 5/1989 | Ashmead | |
| 5,075,499 A | 12/1991 | Walsdorf et al. | |
| 5,152,902 A | 10/1992 | Koskan et al. | |
| 5,186,965 A | 2/1993 | Fox et al. | |
| 5,389,303 A | 2/1995 | Wood et al. | |
| 5,516,925 A | 5/1996 | Pedersen et al. | |
| 6,106,874 A | 8/2000 | Liebrecht et al. | |
| 6,992,203 B2 * | 1/2006 | Trusovs | ............ 556/50 |

OTHER PUBLICATIONS

Fleming et al., Clinical Science (London), Aug. 2001; 101(2) 156-68, A Comparative Study of the Adsorption of Amino Acids on to Calcium Minerals Found in Renal Calculi.

* cited by examiner

*Primary Examiner*—Helen Pratt
(74) *Attorney, Agent, or Firm*—Fitch, Even, Tabin & Flannery

(57) ABSTRACT

The present invention is directed to metastable mineral-amino acid complexes that are formed by combining a mineral oxide, hydroxide, or carbonate an amino acid and an organic acid. The complexes may be used to fortify a variety of food and beverage products.

9 Claims, No Drawings

United States Patent US 7,175,867 B2

METASTABLE MINERAL-AMINO ACID PREPARATIONS FOR FOOD AND BEVERAGE FORTIFICATION

FIELD OF THE INVENTION

The present invention is directed to methods for making metastable complexes of minerals (particularly calcium and magnesium) and amino acids. In addition to these methods, the invention includes the complexes themselves as well as methods of using the complexes to produce fortified food products.

BACKGROUND OF THE INVENTION

Insufficient amounts of essential dietary minerals can lead to poor development in children and severe medical problems in adults. For example, a diet deficient in calcium can result in abnormal skeletal growth and is associated with osteoporosis, particularly in elderly women. The fortification of food products with calcium and other minerals may help prevent disease and also contribute to better overall nutrition.

In order to successfully fortify foods and beverages, minerals must be in a form that does not adversely affect flavor, texture or appearance. This has been particularly difficult in the case of calcium which is often difficult to maintain in an aqueous solution and which sometimes imparts a chalky flavor to foods and beverages. Strategies for overcoming these problems have been reviewed by Weaver (*Int'l Dairy J.* 8:443–449 (1998)) and methods of making fortified beverages and supplements have been described in numerous publications (see e.g., U.S. Pat. Nos. 4,737,375; 6,106,874; and 5,075,999).

One approach that has been taken is to develop amino acid/mineral chelates that can be added to food products. In U.S. Pat. No. 4,830,716, a procedure is described in which amino acids are reacted with metals in a ratio of at least 2:1 to produce chelated minerals. U.S. Pat. No. 5,516,925 discloses metal/amino acid chelates in which sufficient ligand is present to provide ionic, covalent and coordinate bonds equal to the coordination number of the metal ion while maintaining charge balance. Although many of the procedures that have been described appear to be concerned with the formation of stable chelates, metastable complexes of calcium citrate and malate have also been described (U.S. Pat. No. 5,186,965). Further improvements in methods of making mineral complexes will ultimately lead to food products of higher nutritional value.

SUMMARY OF THE INVENTION

The present invention is based upon the development of methods for making metastable complexes of minerals and amino acids that are highly soluble in an aqueous medium and which can be added to food products in high concentration without a deterioration of flavor. The most crucial aspects of the method are: (a) the ratio of amino acid to mineral; (b) the presence of an organic acid at a defined ratio during complex formation; and (c) the rapid removal of water from preparations, preferably by spray drying or freeze drying. The method is especially useful for mineral combinations such as calcium and magnesium to allow for multiple minerals to be delivered in a single ingredient preparation. The invention encompasses the metastable compositions produced by the method as well as the foods and beverages that are fortified using these compositions.

In its first aspect, the invention is directed to a method of forming a metastable mineral complex in which a mineral hydroxide and an acidic or neutral amino acid are mixed together in an aqueous medium to form a solution. An edible organic acid (preferably acetic acid, citric acid, or the like) must also be present in the solution and the molar ratio of mineral/amino acid/organic acid should be about 1.0 mole mineral, to about 0.5 to less than 2.0 mole amino acid, to about 0.01 to about 0.7 mole organic acid. Once the solution has been formed, it is rapidly dried to form a powder containing the metastable complex. It is essential that drying take place as fast as practical using a method that is recognized in the art for rapidly removing water. The preferred methods are spray drying, freeze drying and, to a lesser degree, drum drying. Other methods that are as fast or faster than these would also be considered to result in "rapid" drying for the purposes of the present invention. Methods that are substantially slower (e.g., air drying at ambient pressure) are generally not suitable because they can allow the metastable mineral complex to substantially degrade into a less desirable form or forms having lower solubility in water.

Preferably, the amino acid used to form complexes is acidic with the most preferred amino acids being aspartic acid and glutamic acid. The preferred minerals are calcium, magnesium, iron, and zinc with the most preferred materials used to form complexes being mineral oxides, hydroxides, and carbonates. In all cases, the most preferred ratio of mineral/amino acid/organic acid is about 1.0 mole mineral/ about 1.0 to less than 2.0 mole amino acid/about 0.05 to about 0.5 mole organic acid. The preferred pH of solutions is about 2.5 to about 7.0 and the preferred temperature for complex formation is about 0 to about 50° C. In most instances, it will be most convenient to form complexes at ambient temperature. The final concentration of mineral present in solution prior to drying should be, in general, between about 1.0 mg/mL and about 12.0 mg/mL.

The invention also encompasses the metastable mineral complexes produced by the methods described above and the compositions that contain these complexes. The preferred complexes are those containing calcium and/or magnesium together with aspartic acid and/or glutamic acid. For the purposes of the present invention, metastable mineral/ amino acid complexes are highly soluble in aqueous solution, for example at least about 50 mg and up to about 2000 mg or more dissolved minerals per eight fluid ounces of water at about 25° C., and may be maintained in solution at such high concentration for at least about 24 hours at about 25° C. without the formation of precipitate. This also applies to other metastable mineral complexes such as those having magnesium, iron, zinc, sodium, potassium, phosphorus, and the like. The compositions containing the metastable complexes should be in the form of a dry powder with the mole ratio of mineral to amino acid being about 1.0 mole mineral/ about 0.5 to less than 2.0 mole amino acid, and preferably about 1.0 mole mineral/about 1.0 to less than 2.0 mole amino acid. These compositions should contain at least about 5% by weight of the complexes, with higher percentages being preferred.

Compositions containing the metastable complexes may be added to food or beverage products to improve their nutritional value. Foods that may be fortified include, without limitation, dairy products, baked goods, processed foods and beverages. The present invention encompasses the process of fortifying foods and the fortified foods themselves. When a beverage is fortified, the preferred concentration of the mineral derived from the mineral complex should be between about 1 to about 100% of the U.S. Daily Value, and preferably between about 5 to about 50% of the U.S. Daily Value.

In all of the methods and compositions described above, more than one mineral, can be present at one time. Thus, a single composition may include complexes of both calcium and magnesium. It is also possible to include monovalent or trivalent minerals such as potassium and iron.

DETAILED DESCRIPTION OF THE INVENTION

The present invention is concerned with mineral complexes that can be added to food or beverage products to increase their nutritional value. One important mineral in this regard is calcium, which tends to present problems with regard to solubility in aqueous solution and with regard to flavor and texture in non-aqueous foods. The main characteristic of the complexes formed is that they are metastable (i.e., they are a mixture of various combinations of mineral, amino acid and organic acid that has not yet reached a final stable equilibrium with the surrounding medium). The metastable complexes have a relatively high degree of solubility in aqueous medium (e.g., a solubility of at least about 50 mg and up to about 2000 mg or more dissolved minerals per about 8 fluid ounces of water at a temperature of about 25° C.). Once dissolved, the minerals remain in solution for a period of at least about 24 hours at about 25° C. without forming a significant amount of precipitate. For the purposes of the present invention a significant amount of precipitate is defined as 0.5% or higher of the total amount mineral dissolved.

The method used to form the above-described mineral complexes has several essential features. First, it is essential that an organic acid be present in a ratio of about 1.0 mole of mineral to about 0.01 to about 0.7 mole of organic acid and preferably about 0.05 to about 0.5 mole of organic acid. Although citric acid and acetic acid are preferred, the invention is compatible with the use of other organic acids as well, with the only constraint being suitability for use in a food product.

A second essential feature of the method is the ratio of mineral to amino acid. Specifically, for each mole of mineral present, there should be less than 2.0 moles of amino acid and a minimum of about 0.5 moles. The preferred minerals should be mono-, di-, or trivalent cationic metals, with calcium and magnesium being preferred. Other minerals that can be used in complexes include manganese, iron, copper, zinc, potassium, cobalt, chromium, molybdenum, vanadium, sodium, phosphorus and selenium. These should be added, preferably as an oxide, hydroxide, or carbonate, to an aqueous medium containing the amino acid and organic acid under conditions in which a solution forms. As with all of the components described herein, the minerals should be in a state of purity suitable for use in the desired end product, typically a food product for human ingestion. The amino acids used to form complexes are preferably acidic, with aspartic acid and glutamic acid being the most preferred. Neutral amino acids can also be used but generally tend to produce relatively inferior results. The neutral amino acids that may be employed include glycine, leucine, alanine, phenylalanine, tyrosine, tryptophan, and valine. Most preferably, the amino acids are in their free state, but dipeptides, tripeptides, and quadrapeptides can also be used.

A third essential feature of the method by which complexes are made is that, during the drying process, water must be removed rapidly. The most preferred procedure is spray drying which should convert compositions from a liquid to a powder state in a matter of seconds. Other processes for removing water should be done in vacuo and preferably with the liquid in a frozen state (e.g., freeze drying). As with drying, the freezing of compositions should take place as quickly as possible to maintain the complexes in a transient state. For example, drying in liquid nitrogen or a similar process is generally preferred. Other methods for rapidly removing water from compositions that are known in the art may also be employed, provided that the solubility of the dried complexes is not compromised.

Standard methods for preparing the liquid solutions containing amino acids, minerals, and organic acids are well known in the art and can be applied with respect to the present invention. The order in which the various components are mixed is not essential provided that a final solution is attained. The pH of the final solution (i.e., the solution prior to drying) should be between about 2.5 and about 7.0 (preferably between about 2.5 and about 5.5) and, in general, the preparation of solutions should take place at a temperature of between about 0 and about 50° C.2

The metastable mineral complexes described above may be added to any solid or liquid food product. Typically, the concentration of mineral complex will be in the range of between about 1 to about 100% of the U.S. Daily Value, and preferably between about 5 to about 50% of the U.S. Daily Value. Foods or beverages fortified with the mineral complexes may have any of the additives typically found in these products, including artificial and natural sweeteners, flavorants, colorants, thickeners, stabilizers, vitamins, emulsifiers, antioxidants, and the like. In addition, the foods or beverages may include other minerals and vitamins. Beverages may be carbonated or non-carbonated and be present in a variety of different forms such as ready-to-drink beverages, condensates, concentrates, or powders suitable for reconstitution. The beverages and other food products can be maintained at room temperature, frozen, or refrigerated.

Although it is generally contemplated that the complexes described herein will be used in food products for human consumption, it is recognized that they are also useful as additives for animal feeds. For example, the complexes may be used in products sold for consumption by domestic animals such as dogs or cats, as well as livestock such as poultry, cattle and hogs. The preparations are also compatible with pharmaceutical use, such as in the treatment of patients with osteoporosis.

EXAMPLES

Example 1

Aspartic acid (12 g) was mixed into 500 grams distilled water with 3 grams of calcium hydroxide and 1.4 grams of magnesium hydroxide. Citric acid (2.5 g) was added to reach a final pH of about 5.0 and the preparation was stirred until the mixture was completely solubilized. The solution was then freeze dried. The final calcium concentration in the material was about 8%.

Example 2

A formulated liquid beverage was fortified with the calcium/magnesium/aspartate/citrate composition prepared in Example 1 to deliver about 350 mg of calcium per serving (240 mL 8 fl. oz.). The beverage composition contained approximately: 98.9% water, 0.5% acids, 0.2% preservatives, 600 ppm clouding agent, 500 ppm artificial sweeteners, and 1 ppm artificial color. The fortified sample went into solution readily and was stable (no visible precipitate) and had no negative off-flavors or objectionable sensorial aspects.

Example 3

The beverage composition described in Example 2 was fortified with the calcium/magnesium complex described in Example 1 to deliver about 1000 mg of calcium per serving (240 mL 8 fl. oz). The complex went into solution readily and the beverage had acceptable flavor and appearance.

Example 4

The fortified samples prepared in Example 2 and Example 3 and water preparations at the same calcium concentrations were refrigerated for a week to assess the stability of the calcium/magnesium complex over time. Previous work using a variety of commercial mineral compounds having lower solubility demonstrated that sedimentation typically occurs during the first week of shelf life. However, no visible sediment or precipitate was noted, indicating that the complex is stable in the beverage and water systems tested.

Example 5

The calcium/magnesium complex prepared in Example 1 was tested for solubility in water and it was found that greater than 2 grams of calcium per serving (8 fl. oz.) dissolved at room temperature.

Example 6

The preparation of Example 1 was modified in that magnesium was replaced with sodium (1.92 grams of sodium hydroxide) and contained 7.7% calcium in the dried material. This preparation was tested at about 200 mg per 240 mL in water in the beverage formulation described in Example 2. It was found that the sodium form was also readily soluble and stable with the beverage maintaining a clear appearance during storage in a refrigerator for one month.

Example 7

Glycine, a neutral amino acid, was used instead of the acidic amino acid aspartic acid to prepare the material described in Example 1. In this case, 13.5 grams of glycine and 8.6 grams of citric acid were used to produce a dried material containing 5.7% calcium. This material was tested in the same way as the preparation of Example 6. It was found that higher ratios of citric acid to amino acid were required to solubilize the calcium, and this resulted in a more acidic tasting preparation with lower levels of calcium.

Example 8

The preparation of Example 1 was modified by using 4.7 grams of calcium hydroxide, and 2 grams of citric acid and (no magnesium was included) to increase the final calcium concentration of the material to about 12.6%. This preparation was tested in the same way as the preparation of Example 6. It was found that this material dissolved the most readily of the samples prepared in (i.e., the preparations of Examples 1, 6 and 7). It was also found to have the least impact on flavor.

Example 9

The preparation of Example 8 was oven dried instead of freeze dried. It was found that this resulted in a composition that was not soluble. This example illustrates the importance of rapid drying.

Example 10

The preparation of Example 8 was scaled-up in a pilot plant and dried with a spray dryer. A 45.5 kg batch was made with 4.4 kg of aspartic acid, 1.7 kg of calcium hydroxide, 1.1 kg of citric acid and sufficient water to bring the final composition to 45.5 kg. The pH of the preparation was 4.7. The composition was mixed until a clear solution was obtained and this was then pumped into a spray dryer at 0.3 pounds per minute. The spray dryer was set for an outlet temperature of about 90° C. and fluidized at about 45° C. The dried material contained about 11.8% calcium and was tested at 350 mg per 240 m of flavored water, and in the formulated beverage of Example 2. The flavored water contained: 97.8% water; 1.7% sweetener; 0.16% acids; 0.24% flavor; 0.015% sodium benzoate; and 0.015% potassium sorbate. The spray dried preparation had characteristics similar to the freeze-dried form, exhibiting rapid solubility, high stability over time (evaluated for one month at refrigerated storage), and minimal flavor impact.

Unless otherwise noted all percentages and ratios mentioned are by weight. All references cited herein are fully incorporated by reference. Having now fully described the invention, it will be understood by those of skill in the art that the invention may be performed within a wide and equivalent range of conditions, parameters and the like, without affecting the spirit or scope of the invention or any embodiment thereof.

What is claimed is:

1. A method of forming a metastable mineral complex comprising:
   (a) mixing a mineral in the form of an oxide, a hydroxide, or a carbonate, an amino acid that is acidic or neutral and an organic acid in an aqueous medium to form a solution, wherein the molar ratio of mineral/amino acid/organic acid is 1.0 mole mineral/about 0.5 to less than 2.0 mole amino acid/about 0.01 to about 0.7 mole organic acid; and
   (b) rapidly drying the solution of step (a) to obtain a solid water-soluble material.

2. The method of claim 1, wherein the molar ratio of mineral/amino acid/organic acid is 1.0 mole mineral/about 1.0 to less than 2.0 mole amino acid/about 0.05 to about 0.5 mole organic acid.

3. The method of claim 2, wherein the solution is rapidly dried using spray drying or freeze drying.

4. The method of claim 3, wherein the amino acid is aspartic acid or glutamic acid.

5. The method of claim 4, wherein the mineral is calcium.

6. The method of claim 4, wherein the mineral is magnesium.

7. The method of claim 4, wherein the organic acid is citric acid or acetic acid.

8. The method of claim 4, wherein the solution is at a pH of about 2.0 to about 7.0.

9. The method of claim 1, wherein the solution is at a pH of about 2.0 to about 7.0; the temperature of the solution prior to drying is maintained at about 0 to about 50° C.; and the mineral is present in the solution at between about 1.0 mg/mL and about 12.0 mg/mL.

* * * * *